(12) United States Patent  (10) Patent No.: US 6,745,328 B1
Searle  (45) Date of Patent: Jun. 1, 2004

(54) ENCRYPTION USING A USER-KNOWN AND PERSONALLY VALUABLE KEY TO DETER KEY SHARING

(75) Inventor: Scott Searle, Kirkland, WA (US)

(73) Assignee: LockStream Corporation, Bellevue, WA (US)

(*) Notice: Subject to any disclaimer, the term of this patent is extended or adjusted under 35 U.S.C. 154(b) by 0 days.

(21) Appl. No.: 09/425,862

(22) Filed: Oct. 23, 1999

(51) Int. Cl.⁷ .................................................. G06F 1/24
(52) U.S. Cl. ....................... 713/193; 713/161; 713/168; 713/200; 713/201
(58) Field of Search ................................ 713/193, 161, 713/168, 182, 194, 200, 201

(56) References Cited

U.S. PATENT DOCUMENTS

| | | | |
|---|---|---|---|
| 5,337,357 A | 8/1994 | Chou et al. | 380/4 |
| 5,459,488 A | 10/1995 | Geiser | |
| 5,586,186 A | 12/1996 | Yuval et al. | 380/30 |
| 5,694,381 A | 12/1997 | Sako | 369/58 |
| 5,889,860 A | 3/1999 | Eller et al. | 380/4 |
| 5,905,797 A | 5/1999 | McRae | 380/3 |
| 5,933,497 A | 8/1999 | Beetcher et al. | 380/4 |
| 5,953,005 A * | 9/1999 | Liu | 715/500.1 |
| 5,956,716 A * | 9/1999 | Kenner et al. | 707/10 |
| 6,005,935 A | 12/1999 | Civanlar et al. | 380/4 |

FOREIGN PATENT DOCUMENTS

| | | |
|---|---|---|
| EP | 0 844 550 A | 5/1998 |
| JP | 07334916 | 4/1996 |
| JP | 10207808 A | 11/1998 |
| WO | WO 98/37483 | 8/1998 |

OTHER PUBLICATIONS

Marc Abrams and Constantinos Phanouiou, "UIML: An XNL Language for Building Device–Independent User Interfaces" Proceedings of the XML '99 Conference (http://www.harmonia.com/resources/papers/xml199final.pdf).

Yuval et al., Method and System for Controlling Unauthorized Access to Information Distributed to Users, U.S. Pat. No. 5,586,186, Dec. 17, 1996.

Eller et al., Encryption System with Transaction–Coded Decryption Key, U.S. Pat. No. 5,889,860, Mar. 30, 1999.

*The Format Frenzy In Digital Music*, http://www.washingtonpost.com/wp–srv/business/feed/a3191–1999oct1.htm, (Copyright dated 1999) (3 pages).

* cited by examiner

Primary Examiner—Thomas R. Peeso
(74) Attorney, Agent, or Firm—Patrick J. S. Inouye

(57) ABSTRACT

Using a user-known and personally valuable key for encryption and decryption of information is disclosed. The information can be multimedia information, such as audio, music, video, image and other types of such information, like text information. The key can in varying embodiments be a combination of one or more of a user's credit card number, social security number, bank account number, and driver's license number, as well as other information that is user-known and personally valuable to the user.

25 Claims, 5 Drawing Sheets

ENCRYPTION USING A USER-KNOWN AND PERSONALLY VALUABLE KEY TO DETER KEY SHARING

FIELD OF THE INVENTION

This invention relates generally to encryption and decryption of information, such as multimedia information, accomplished via a key, and more particularly to such encryption and decryption accomplished via a key that is user known and personally valuable, such as a credit card number.

BACKGROUND OF THE INVENTION

The Internet has become a popular manner by which to purchase multimedia information such as music, a phenomenon that seemingly will only increase over time as more consumers have the ability to connect to the Internet, and as their connections are at greater bandwidths to permit other multimedia information, such as video, to also be easily purchased. While actors, artists and companies responsible for producing and distributing such multimedia information generally applaud new manners of distribution, they are nevertheless somewhat concerned about the Internet and other manners by which digital versions of their content can be distributed. This is because a copy of a digital version of content can easily be duplicated illegally by consumers, potentially decreasing the revenue taken in by the rightful owners of the content.

One solution that has been suggested and used within the prior art is the encryption of multimedia information via known encryption schemes. Usually, and especially in the context of multimedia information purchased by end consumers, the information is encrypted with a key. Knowledge of the key, therefore, is required to decrypt the information; without the key, the encrypted information is unintelligible. Thus, even if many digital copies of a particular song or movie were distributed over the Internet to end users all over the world, unless a given end user knows the key to unlock the encrypted copy, the song or movie is useless.

A barrier to the overall effectiveness of this approach is, however, that little deters a consumer who has purchased encrypted multimedia information from sharing the key provided to him or her with others, or even from posting the key on the Internet along with the encrypted information. While content owners can assign each purchaser of content with a unique key, such that illegal distribution of the key can be traced back to the original purchaser, this puts the onus of enforcement on the owners themselves, which will likely be time-consuming and expensive. Furthermore, the owners are put in the uncomfortable position of bringing action against their own customers, which may lead to public relations and other problems where it turns out that the key assigned to a particular consumer was distributed on a large scale through no fault of the consumer—for example, where the key was stolen from the consumer.

For these and other reasons, then, there is a need for the present invention.

SUMMARY OF THE INVENTION

The invention provides for using a user-known and personally valuable key, such as a credit card number, for encryption and decryption of information such as multimedia information. In one embodiment, a computer-implemented method involves transmitting a request for information from a client to a server over a network, such as the Internet. The information is encrypted with a key that is known to a user of the client and that is personally valuable to the user, to inhibit the user from sharing the key with others. The encrypted information is transmitted from the server to the client over the network. In one particular embodiment, the information is multimedia information, such as audio, music, video and/or image information, and the key is a credit card number of the user. The invention is not limited to information that is multimedia information, however; other types of information include text information, software programs (for the electronic distribution thereof), etc.

Embodiments of the invention provides for advantages not found within the prior art. A user has significant motivation not to share with others the key to decrypting encrypted information, where the key is known to the user and personally valuable to him or her, such as a credit card number, a driver's license number, or a social security number. Thus, embodiments of the invention change illegal key distribution from being a matter in which the onus of enforcement is placed on the content owner, to a matter in which the onus of prevention is placed on the content user. Regardless of whether a user may fear legal repercussions from the seller of the encrypted information, he or she is very likely to worry about the damage that may result personally should the user share the key with others.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

Figure 1:
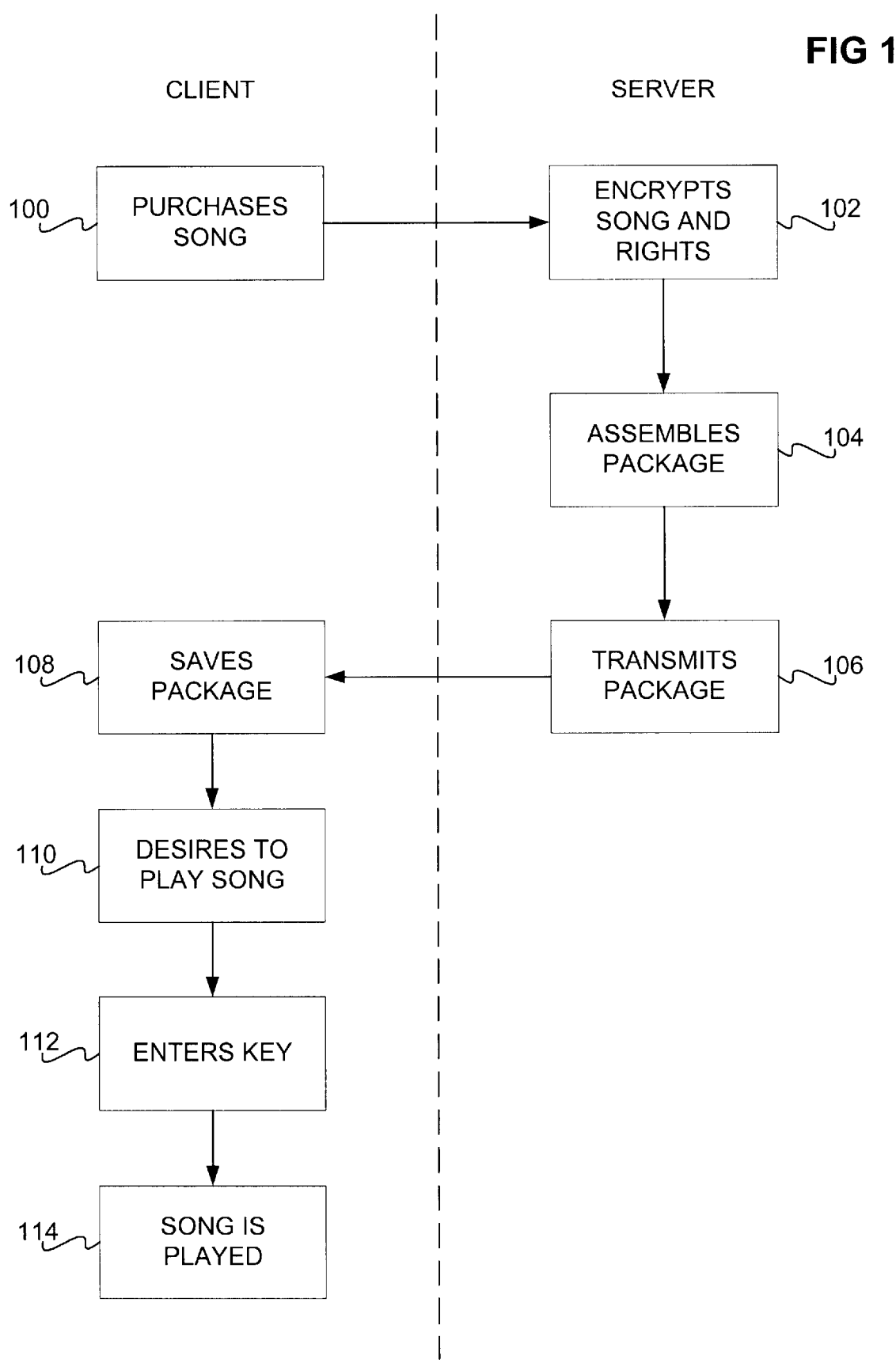
FIG. 1 is a flowchart of a method illustrating the operational conduct between a client and a server in the context of a specific embodiment of the invention, to which the invention itself is not limited.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Cryptography Background

In this section of the detailed description, a brief summary of cryptography is presented. Embodiments of the invention are not limited to a particular scheme by which to perform encryption and decryption. Those of ordinary skill within the art can appreciate that many such different schemes exist, and can be used in accordance with embodiments of the invention. One common scheme that can be used by embodiments of the invention, but to which the invention itself is not limited, is known as the Data Encryption Standard, or DES. Other known schemes include, Rivest Cipher #4 (RC4), Rivest Cipher #2 (RC2), SKIPJACK, International Data Encryption Algorithm (IDEA), Blowfish, Twofish, triple DES (3DES), EEE3, EDE3, EEE2, and EDE2.

Cryptography generally is the conversion of data into a secret code, so that, for example, it can be transmitted over a public network, such as the Internet. The original data is converted (encrypted) into a coded equivalent via an encryption algorithm, or scheme. The encrypted data is decoded (decrypted) at the receiving end and turned back into the original data. The encrypted data is typically unintelligible.

An encryption scheme uses a key, for example, a binary number that is between 40 to 128 bits in length. The data is "locked" for sending by combining the bits in the key mathematically with the data bits. At the receiving end, the key is used to "unlock" the code, restoring it to its original binary form. The particular types of keys that are used by embodiments of the invention are described in a later section of the detailed description. A key used by an encryption or decryption scheme is generally referred to as a code that is combined in some manner with the original data or information to encrypt the data or information for security purposes.

It is noted that in conjunction with embodiments of the invention, a key can be a number, characters, or any combination thereof. That is, where a key is referred to herein as a number, this is one example of what a key can be. Those of ordinary skill within the art can appreciate that the invention is not so limited, and that keys made up of characters, as well as numbers and characters, in addition to just numbers, are also applicable to embodiments of the invention.

Multimedia Information Example Embodiment

In this section of the detailed description, a specific example embodiment of the invention relating to the purchase of multimedia information, including but not limited to sound, music, video and image information, is described. The invention itself is not limited to this specific embodiment; further sections of the detailed description recite other embodiments of the invention. The specific example embodiment described in this section specifically also relates to a client-server context in which a consumer, or user, purchases music information, such as a song, a collection of songs, or an album of songs, by connecting his or her client, such as a desktop computer, over a network, such as the Internet, to a server that may be run by an electronic commerce provider, a recording or distribution company, etc. Again, however, the invention is not so limited.

Furthermore, the invention is amenable to other audio information besides just music, such as songs and albums of songs. Such audio information can include music information, as well as non-music information like books being read, talk show radio programs, old radio programs, etc. In addition, other information in conjunction with which embodiments of the invention may be practiced, besides multimedia information, includes text information, such as books, magazines and magazine articles, newspapers and newspaper articles, etc. Still other information includes software programs, for the electronic distribution thereof.

Referring now to FIG. 1, a flowchart of this specific example embodiment is shown. The flowchart is divided by a dotted line into those parts thereof performed at the client side, and those parts thereof performed at the server side. An arrow crossing over from one side to another indicates that information is being transmitted from the client to the server side, and/or from the server to the client side.

In 100, a user uses his or her client to connect with a server, such as over the Internet by using a web browser program to view a web site located at the server. The user purchases a song. In other words, more generally, a request is transmitted for multimedia information from a client to a server, over a network such as the Internet. The server receives this request, and assuming that the purchase is approved, the method continues in 102.

In 102, data representing the desired song, that is, the desired multimedia information, is encrypted with a key. In one embodiment, the song is in MP3 format. MP3 is an audio compression technology known within the art that is part of the MPEG-1 and MPEG-2 specifications. The invention is not limited to MP3 formatted music data, however; other formats include the Microsoft Windows Player and the Real Networks Real Player formats. Other formats can be used and are amenable to embodiments of the invention as well. Where the multimedia information is not music, but video or image data, other formats can also be used, as can be appreciated by those of ordinary skill within the art.

In one embodiment, besides the song being encrypted, rights information regarding the playback of that song by the purchaser thereof (viz., the user of the client) is also encrypted. The rights information generally refers to the rights governing the user's ability to play back the song on his or her client, or another computerized device. Such rights include, although the invention is not limited to: 1) play once, such that the user is able to play back the song only one time; 2) play many, such that the user is able to play back the song a predetermined number of times, or an unlimited number of times; 3) time limited, such that the user is able to play back the song for a predetermined duration of time, or until a predetermined date and/or time has been reached; and/or, 4) play on portable devices, such that a user is able to copy the song to a portable device and play it back on the device.

The key utilized in encrypting the song, or other multimedia information or other info r m nation, as well as the rights information if so present, is a key that is known to the user of the client, and that has personal value to the user. Such a key acts as a deterrent to the user sharing the key with others, such as by posting the key on the Internet, sending the key to others via e-mail, etc. That is, the key inhibits the user from sharing it with others by being something that is known to the user and personally valuable to him or her.

For example, in varying embodiments of the invention, the key can be one of the following, or a combination of two or more of the following: a credit card number, a driver's license number, a checking account number, a debit card number, a social security number, a bank account number, etc. The invention is not limited to any of the above-recited keys, however, and is inclusive of any other such user-known and personally valuable information not recited above.

The statement that the song, multimedia information, or other information, as well as potentially the rights information, is encrypted using a key comprising user-known and personally valuable information is now described. Those of ordinary skill within the art understand that encryption is typically performed by a key that is any number of bits in length, such as between 40 and 128 bits in length. Each bit is either a 1 or a 0. The statement that information is encrypted using a key as described in the previous paragraph means that the ultimate key used in the encryption scheme is based on information that is known to the user and personally valuable to him or her. It does not mean that the key literally has to be such information, but that the key is based on that information in some manner.

For example, using the user-known and personally valuable information as a starting point, embodiments of the invention can convert or otherwise manipulate this information to produce the actual key as may be required by the encryption scheme being used. Each digit of a credit card number, for instance, may be converted into an eight-bit binary number, the conversions of all such digits of the credit card number concatenated together, and every second or third bit selected until the needed number of bits to make the actual key has been obtained. This is only one example, however, and the invention is not so limited. Thus, when it is stated that personally valuable and user-known information is used as a key, those of ordinary skill within the art can appreciate that this is shorthand for stating that such information is used as a starting point from which the actual key used by an encryption scheme is derived.

The key, by being personally valuable to the user and known to him or her, inhibits the user from sharing the key with others in at least some embodiments of the invention as is now described. The user will likely be concerned and thus reticent about sharing this information that acts as the key with others, since it can be used by bad-intentioned others to cause harm to the user. For example, in the case of a credit card number of the user, if the user distributes the number, others can use the number to charge purchases on the user's credit card account, which the user may be responsible for. As another example, in the case of a driver's license number or a social security number, if the user distributes the number, others can potentially use the number to engage in what is known as identity theft: using the user's personal information to pretend that he or she is the user, and thus use the personal information to obtain fraudulently credit cards, loans, etc., for which the user is ostensibly responsible. Therefore, by making the key the user's credit card number, for instance, the user has a personal motivation not to distribute the key.

It is also noted that the key is user known not necessarily in that the user has memorized the number, but that the user has legitimate and legal access to the number. For instance, while a user may not have memorized his or her driver's license number, it is known to the user in that the number is written on his or her driver's license, and is an identification number of the user to which the user has legitimate and legal access. Furthermore, it is noted that the key is personally valuable to the user in that the key is linked in some manner to the user, in such a way that distribution of the key by the user can potentially cause the user harm, as described above. For instance, a credit card number is linked to the user in that it is the number of the account the user has with a credit card company.

Still referring to FIG. 1, in one embodiment, in 104 the information encrypted in 102, along with other information as may be desired, is assembled into a package of data, which may exist as one or more computer files. 102 is not required by the invention, however, but is only present in some embodiments of the invention. For example, in one embodiment, the package includes the following information: (1) a unique identifier of the client in an unencrypted format (viz., unique identification information), such as the identification number of the processor of the client, if one exists, the network adapter's Media Access Controller (MAC) address, if one exists, and/or, the user name as present in what is known as a registry file, if the client is running a version of the Microsoft Windows operating system; (2) the multimedia information, such as the song, as has been encrypted; (3) the rights information to the multimedia information, as has also been encrypted; and, (4) identification information regarding the user, such as the name, address, city, postal code (e.g., ZIP code) and/or telephone number of the user. The invention is not limited to a particular format in which this information can be placed.

Next, in 106, the server transmits the package to the client, which receives it, and, in one embodiment, in 108, saves the package to non-volatile storage. For example, the package may be saved to a hard disk drive, or non-volatile memory, such as flash memory, compact flash memory, etc., as is known in the art. The invention does not require 108, however, and when present, 108 does not require a particular type of storage to which the package is saved.

In another particular embodiment of the invention, the information is not sent as a complete package, but rather is sent as a stream of data, as known within the art. Thus, a client may make periodic requests for specific parts of the information, and decode them on the fly. Embodiments of the invention are therefore amenable to whether the information is received as a complete whole, or in segments as part of a stream.

Thus, when the user desires to play the song, or otherwise play back or access the multimedia information or other information that has been requested in 100 and encrypted by the server in 102, the key is entered in 112. By entered, it is meant that the user is queried to enter the credit card number or other key using an input device such as a keyboard, or that the credit card number is stored elsewhere, such that it is retrieved and entered without user input—such as, for instance, by being stored on a hard disk drive of the client for access. The key is then input as a starting point to derive the actual key used to decrypt the encrypted information, as has been described above, such that the song is played in 114, or the decrypted information is otherwise played back or accessed.

A specific example embodiment of the invention has been described. It is noted that this method of one embodiment of the invention can be computer-implemented. Furthermore, the method can be realized at least in part as one or more programs, or parts thereof, each having a number of instructions, running on a computer or other such device— that is, as a program executed from a machine- or a computer-readable medium such as a memory by a processor of a computer or other such device. The programs are desirably storable on a machine-readable medium such as a compact flash memory, floppy disk or a CD-ROM, for distribution and installation and execution on another computer.

Method According to Another Embodiment

In this section of the detailed description, a method more general than that described in the previous section, according to one embodiment of the invention, is described. Like the method of the previous section, the method can be computer-implemented, be implemented as a number of instructions over one or more computer programs for execution by a processor from a medium, and/or be stored as a number of instructions over one or more programs for distribution, installation, and/or execution purposes.

Figure 2:
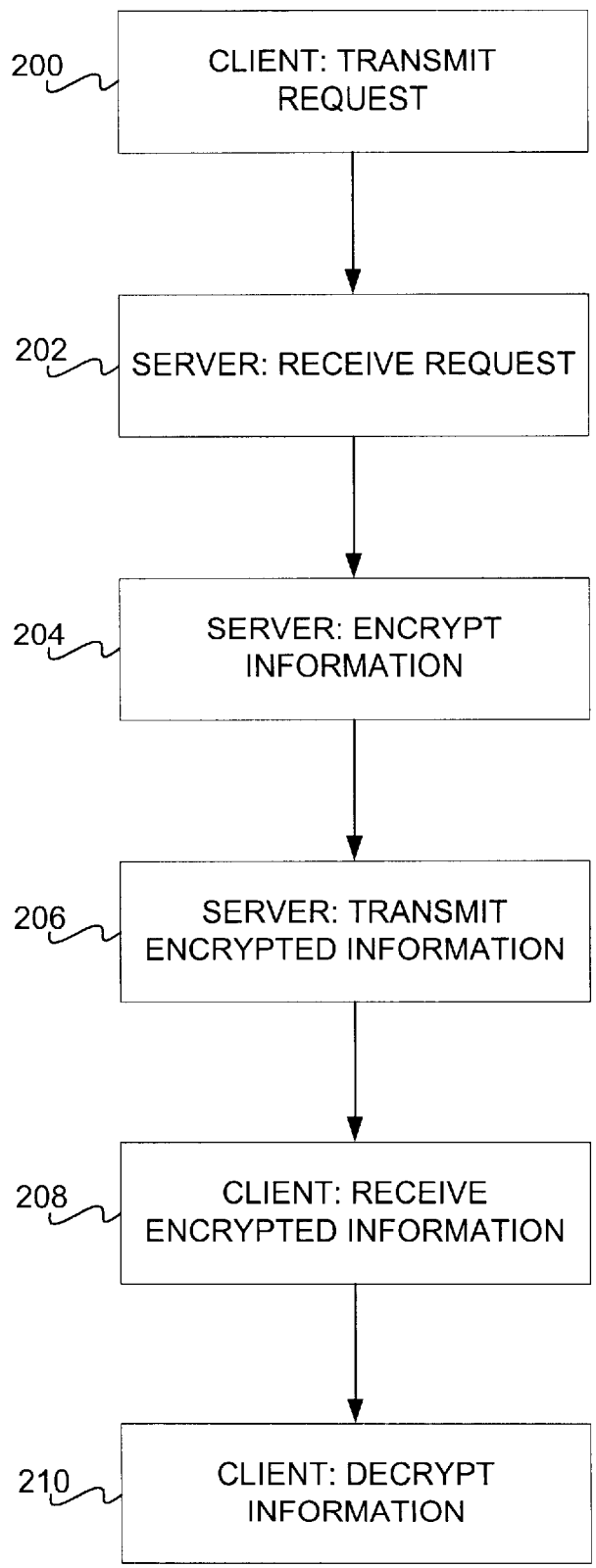
FIG. 2 is a flowchart of a method according to a more general embodiment of the invention than that of FIG. 1.

Referring now to FIG. 2, a flowchart of this method is shown. In 200, a request for information, such as multimedia information, is transmitted from a client to a server, over a network such as the Internet. In 202, the server receives the request.

In 204, the information is encrypted at the server, with a key having personal value and known to the user of the client, to inhibit the user from sharing the key with others. This is performed as is described in the previous section of the detailed description.

In 206, the server transmits the information, as encrypted, along optionally with other encrypted information, such as rights information, and/or unencrypted information. In one embodiment, the information is transmitted by first being assembled as a package, as has been described in the previous section. The information is transmitted to the client over the network. In 208, the client receives the encrypted information.

In 210, the encrypted information is decrypted at the client using the key known to and personally valuable to the user, as is described in the preceding section of the detailed description. After decryption, the information can be accessed for play back, etc.

Client-Server Architecture

In this section of the detailed description, a general client-server architecture, in accordance with which embodiments of the invention can be practiced, is described. The client-server architecture of this section is one manner by which the client and server communication describing in the preceding sections of the detailed description can be accomplished. However, the invention is not so limited.

Figure 3:
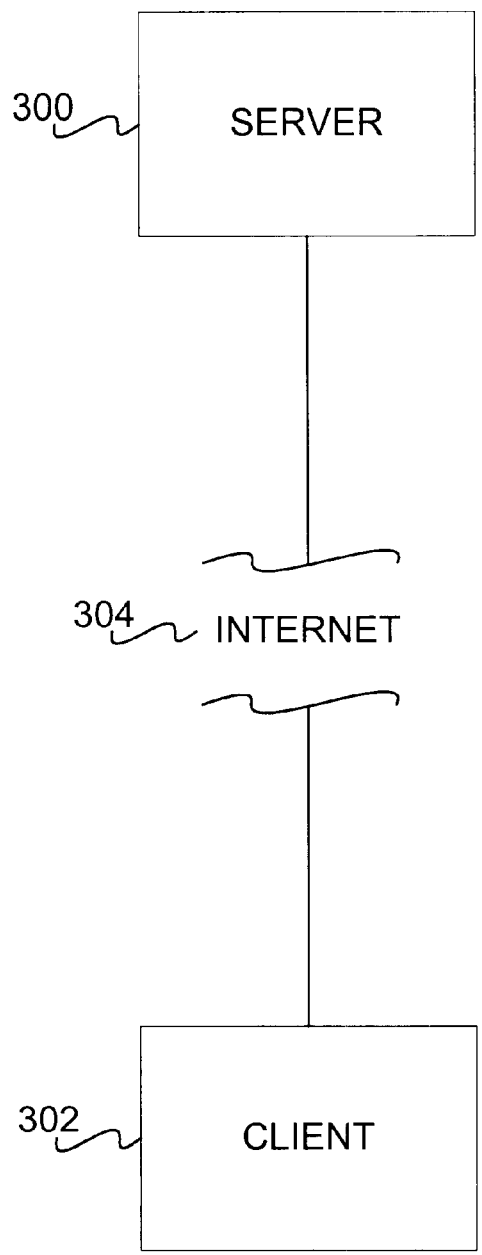
FIG. 3 is a diagram of a typical client-server architecture in accordance with which embodiments of the invention may be practiced.

Referring to FIG. 3, a diagram of a client and a server is shown. The client 302 is communicatively coupled to the server 300 over the network 304, which as shown in FIG. 3 is the Internet; other networks include wide-area networks (WAN's), intranets, and bulletin-board systems (BBS's); the invention is not limited to a particular type of network, nor to the list just recited. Each of the client 302 and the server 300 can be one or more computers or similar such devices, as is more specifically described in a succeeding section of the detailed description. Such computers and similar such devices include desktop computers, server computers, laptop computers, notebook computers, personal-digital assistant (PDA) devices, MP3 devices, and other such devices. The invention is not limited to this recited list of computers and devices, however, as can be appreciated by those of ordinary skill within the art.

Furthermore, as has been described in the previous sections of the detailed description, decryption is accomplished at the client that has received the encrypted information from the server. However, this is but one example by which the encrypted information can be used. For example, in another embodiment, the encrypted information is then transmitted from the client to another computer or device, at which the information is decrypted and played back or otherwise accessed.

For example, in the context of multimedia information relating to music, such as songs, a client may be a desktop computer used by the user to access a particular music-oriented web site, to purchase and download an encrypted song in MP3 format. The user may then transfer this song to an MP3 device, as known and available within the art, for playback. Decryption can occur either at the client prior to transfer to the MP3 device, or at the MP3 device itself. The invention is not limited to a particular manner by which or a particular location at which encrypted information, once received, is decrypted and accessed or otherwise played back.

Another Method According to Another Embodiment

In this section of the detailed description, another method more general than that described in conjunction with FIG. 1, according to one embodiment of the invention, is described. Like the method of FIG. 1, the method can be computer-implemented, be implemented as a number of instructions over one or more computer programs for execution by a processor from a medium, and/or be stored as a number of instructions over one or more programs for distribution, installation, and/or execution purposes.

Figure 4:
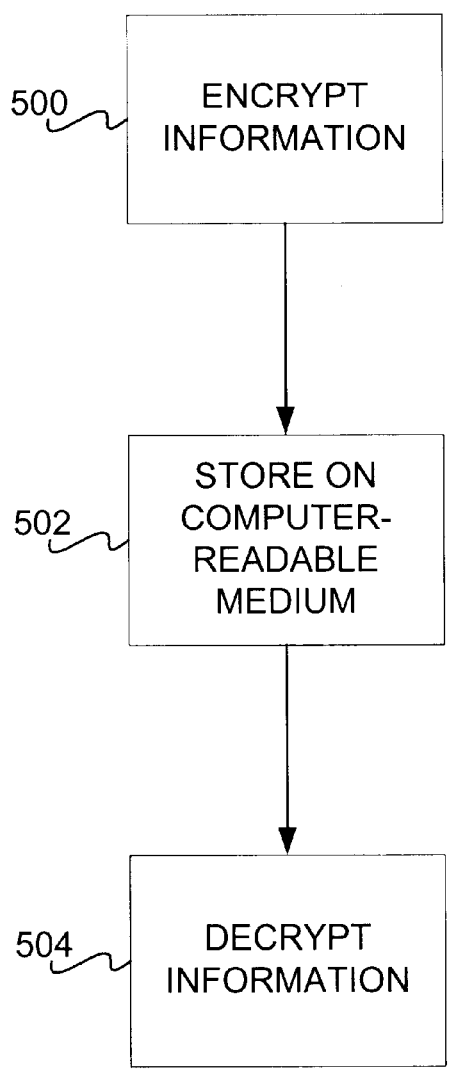
FIG. 4 is a flowchart of a method according to another more general embodiment of the invention than that of FIG. 1; and, FIG. 5 is a block diagram of a representative computer or computerized device in conjunction with which embodiments of the invention may be practiced.

Referring to FIG. 4, a flowchart of this method is shown. In 500, information is encrypted using a key that is known to a user and personally valuable to him or her, as has been described. In 502, this information is stored on a medium such as a computer-readable medium like a compact flash card, a floppy disk, a CD-ROM, etc.; the invention is not limited to a particular type of medium, nor to the list just recited. Finally, in 504, the encrypted information, as stored on the medium, is retrieved therefrom and decrypted using the key that is user known and personally valuable to the user, as has also been described.

Representative Computer or Other Such Device

In this section of the detailed description, a representative computer or other such device in conjunction with which embodiments of the invention may be practiced, and one or more of which can act as a client or a server as referred to in the previous sections of the detailed description, is described. However, the invention is not limited to the representative computer or other such device described herein. The phrase "other such device" is used to reflect the fact that devices other than computers can be used in accordance with embodiments of the invention—for example, PDA devices and MP3 devices, as have been listed in a preceding section of the detailed description, although the invention is not limited to an other such device particularly recited herein.

Figure 5:
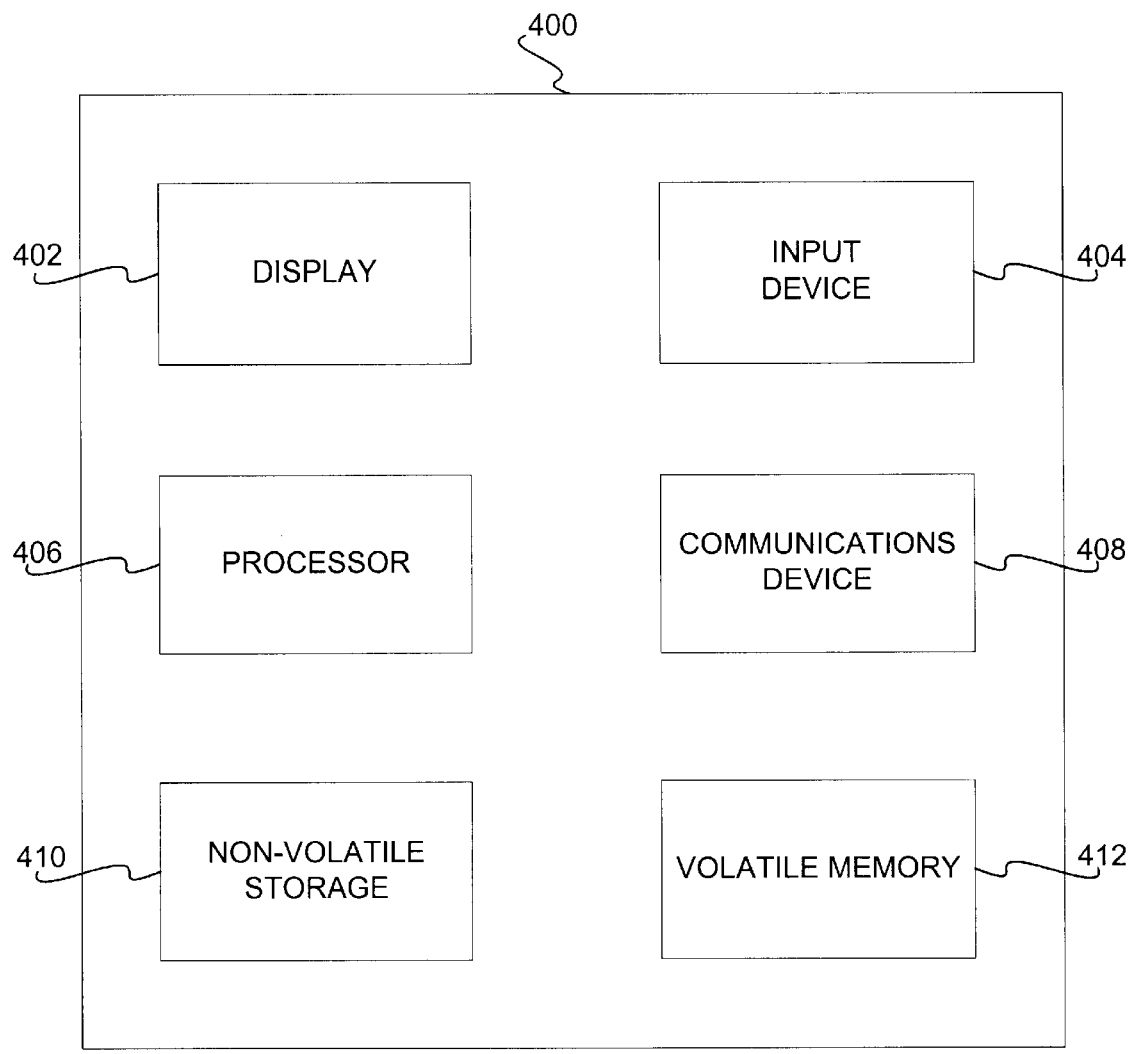

The computer or other such device is shown in block diagram form in FIG. 5. The computer or other such device 400 desirably includes one or more of desirably but not necessarily each of the following components. The display 402 can include a flat-panel display, such as a liquid crystal display (LCD), or a cathode-ray tube (CRT) display. The input device 404 can include a keyboard, a pointing device such as a mouse, trackball or touch pad, a touch screen, one or more buttons, etc. The processor 406 executes instructions implementing methods of varying embodiments of the invention. The communications device 408 can be used to communicate with another computer or other such device— to communicate with a client, for example, in the case of a server, and vice-versa. The device 408 may be a network adapter, a modem, a wireless transceiver, etc. The non-volatile storage 410 can include a hard disk drive, and/or non-volatile memory such as flash and compact flash memory, such as in the form of memory cards. The volatile memory 412 typically includes a version of dynamic random-access memory (DRAM), as known within the art.

Conclusion

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

I claim:

1. A computer-implemented method comprising:
    transmitting a request for information from a client to a server over a network;
    encrypting at the server the information with a key having personal value and known to a user of the client to inhibit the user from sharing the key with others; and,
    transmitting the information as encrypted from the server to the client over the network.
2. The method of claim 1, wherein the information comprises one of: text information and multimedia information.
3. The method of claim 2, wherein the multimedia information comprises one of: audio information, music information, video information, and image information.
4. The method of claim 2, wherein the information further comprises rights information to the multimedia information.
5. The method of claim 1, wherein the key comprises at least one of: a credit card number of the user, a social security number of the user, a bank account number of the user, and a driver's license number of the user.
6. The method of claim 1, further comprising transmitting unencrypted second information from the server to the client over the network.
7. The method of claim 6, wherein the unencrypted second information comprises at least one of: unique identification information regarding the client; and, identification information regarding the user.
8. The method of claim 1, wherein the network comprises the Internet.
9. A computer-implemented method comprising:
    transmitting a request for multimedia information from a client to a server over a network;
    encrypting at the server the information with the key comprising a credit card number of a user of the client; and,
    transmitting the information as encrypted from the server to the client over the network.
10. The method of claim 9, wherein the multimedia information comprises one of: audio information music information, video information, and image information.
11. The method of claim 9, wherein the network comprises the Internet.
12. A machine-readable medium having instructions stored thereon for execution by a processor of a server to perform a method comprising:
    receiving a request for multimedia information from a client;
    encrypting the information with a key comprising a credit card number of a user of the client; and, transmitting the information as encrypted to the client.
13. The medium of claim 12, wherein the information comprises one of: text information and multimedia information.
14. The medium of claim 13, wherein the multimedia information comprises one of: audio information, music information, video information, and image information.
15. The medium of claim 13, wherein the information further comprises rights information to the multimedia information.
16. The medium of claim 12, wherein the key comprises at least one of: a credit card number of the user, a social security number of the user, a bank account number of the user, and a driver's license number of the user.
17. The medium of claim 12, further comprising transmitting unencrypted second information from the server to the client over the network.
18. The medium of claim 17, wherein the unencrypted second information comprises at least one of: unique identification information regarding the client; and, identification information regarding the user.
19. A machine-readable medium having instructions stored thereon for execution by a processor of a server to perform a method comprising:
    receiving a request for multimedia information from a client;
    encrypting the information with a key comprising a credit card number of a user of the client; and
    transmitting the information as encrypted to the client.
20. The medium of claim 19, wherein the multimedia information comprises one of: audio information, music information, video information, and image information.
21. A computer-implemented method comprising:
    encrypting information with a key having personal value and known to a user of the client to inhibit the user from sharing the key with others; and,
    storing the information as encrypted on a medium.
22. The method of claim 21, further comprising decrypting the information as encrypted and stored on the medium using the key.
23. A computer-implemented method comprising:
    encrypting multimedia information with a key comprising a credit card number of a user; and,
    storing the information as encrypted on a medium.
24. The method of claim 23, further comprising decrypting the information as encrypted and stored on the medium using the key.
25. The method of claim 23, wherein the multimedia information comprises one of: audio information, music information; video information; and image information.

* * * * *